US012238625B2

(12) United States Patent
Bidkar et al.

(10) Patent No.: US 12,238,625 B2
(45) Date of Patent: Feb. 25, 2025

(54) SYSTEM AND METHOD FOR DETERMINING DEVICE STATUS USING LoRaWAN

(71) Applicant: Bank of America Corporation, Charlotte, NC (US)

(72) Inventors: Prashant Anna Bidkar, Delhi (IN); Ankit Upadhyaya, Haryana (IN); Prashant Khare, Maharashtra (IN); Suman Boroi Tamuly, Assam (IN); Harmeet Singh, New Delhi (IN); Bharat Indrakanti, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 272 days.

(21) Appl. No.: 17/939,143

(22) Filed: Sep. 7, 2022

(65) Prior Publication Data
US 2024/0080649 A1    Mar. 7, 2024

(51) Int. Cl.
  *H04W 4/80* (2018.01)
  *H04W 12/06* (2021.01)
(52) U.S. Cl.
  CPC ........... *H04W 4/80* (2018.02); *H04W 12/068* (2021.01)
(58) Field of Classification Search
  None
  See application file for complete search history.

(56) References Cited

U.S. PATENT DOCUMENTS

| 6,163,771 | A | 12/2000 | Walker et al. |
| 10,037,522 | B2 | 7/2018 | Insanic |
| 10,470,146 | B2 | 11/2019 | Lalam et al. |
| 11,190,861 | B2 | 11/2021 | Bali |
| 11,863,328 | B2 * | 1/2024 | Zhu ........................ H04L 1/1874 |
| 2019/0140908 | A1 * | 5/2019 | Ma ........................ H04W 48/16 |
| 2019/0318382 | A1 | 10/2019 | Yang et al. |

(Continued)

FOREIGN PATENT DOCUMENTS

| CN | 106559743 A | 4/2017 |
| CN | 209462399 U | 10/2019 |

(Continued)

OTHER PUBLICATIONS

Panicker et al., A LoRa Wireless Mesh Network for Wide-Area Animal Tracking, IEEE International Conference on Electrical Computer and Communication Technology (ICECCT). (Year: 2019).*

(Continued)

*Primary Examiner* — Mohammed Rachedine
(74) *Attorney, Agent, or Firm* — Banner & Witcoff, Ltd.

(57) ABSTRACT

Device information may be obtained using LoRaWAN communications. A device information request may be generated and transmitted by a user device and include request parameters such as a device type for which information is desired, a type of information requested, a geographic range for the request, and the like and/or combinations thereof. Device information requests may also be propagated or repeated by intermediary devices to achieve the desired request range. Accordingly, a recipient device of the original request may propagate or repeat, using LoRaWAN, a request signal if it determines that the request range has not been met. If the request range has been met, the recipient device might not repeat the request.

20 Claims, 10 Drawing Sheets

(56) References Cited

U.S. PATENT DOCUMENTS

| | | | |
|---|---|---|---|
| 2020/0044831 A1 | 2/2020 | Soundararajan et al. | |
| 2020/0052734 A1 | 2/2020 | Talla et al. | |
| 2021/0337355 A1 | 10/2021 | Sobol et al. | |
| 2022/0117039 A1 | 4/2022 | Laine et al. | |
| 2023/0067617 A1* | 3/2023 | Riley | H04W 4/029 |
| 2023/0318548 A1 | 10/2023 | Yamaguchi | |
| 2024/0230826 A1* | 7/2024 | Dwivedi | G01S 5/0036 |

FOREIGN PATENT DOCUMENTS

| | | | |
|---|---|---|---|
| CN | 109525566 B | | 12/2020 |
| WO | WO-2022149918 A1 | * | 7/2022 |
| WO | WO-2022260569 A1 | * | 12/2022 |
| WO | WO-2024028705 A1 | * | 2/2024 |

OTHER PUBLICATIONS

Oct. 17, 2023—(US) Notice of Allowance—U.S. Appl. No. 17/939,125.
Basu et al., "Security issues of low power wide area networks in the context of LoRa networks." arXiv preprint arXiv:2006.16554 (2020).
Nov. 24, 2023—(US) Non-Final Office Action—U.S. Appl. No. 17/939,131.
Fischer, Jeffrey, "NFC in cell phones: The new paradigm for an interactive world [Near-Field Communications]." IEEE communications Magazine 47.6 (2009): 22-28 (Year: 2009).
Jul. 31, 2024—(US) Notice of Allowance—U.S. Appl. No. 17/939,131.
Sanchez-Iborra, Ramon, "LPWAN and embedded machine learning as enablers for the next generation of wearable devices." Sensors 21.15 (2021): 5218 (Year: 2021).
Mar. 25, 2024—(US) Final Office Action—U.S. Appl. No. 17/939,131.

* cited by examiner

SYSTEM AND METHOD FOR DETERMINING DEVICE STATUS USING LoRaWAN

BACKGROUND

Aspects of the disclosure relate to electrical computers, systems, and devices for performing electronic communications, authentication and validation.

Many existing authentication mechanisms require communications using Internet networks or cellular networks. For example, when logging into a system to authenticate a user, a computing device will often require a connection to the Internet to confirm a username and password pair with a remote authentication server. In another example, some payment processing systems require receipt of a code on a user's mobile device through either a Wi-Fi connection or cellular connection (e.g., text messages) that must be used to authenticate the user for a particular transaction. Moreover, Wi-Fi and cellular connections typically require higher levels of power consumption (e.g., as compared to Bluetooth™ and near-field communications (NFC)) to process such communications. This may prevent some mobile devices that do not have large battery capacities from performing authentication processes.

Although other communication protocols such as Bluetooth™ and NFC might have lower power consumption, they are known to be short range protocols. Accordingly, a user's device must be within a short physical range (e.g., 6 feet, 15 feet, etc.) of the other device in order to achieve electronic communications. This requirement may limit the usefulness of such short range communication protocols in many systems, including in the validation and authentication contexts.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to some aspects, electronic communications may be performed using a low power, long range protocol such as the low power long range (LoRa) wide area network (LoRaWAN) communication protocol. LoRa is a radio communication technique based on spread spectrum modulation techniques derived from chirp spread spectrum (CSS) technology. Devices using LoRa may establish a LoRaWAN that does not require other networking technologies such as the Internet, cellular connectivity, NFC and/or Bluetooth™. For example, a LoRaWAN signal may be used to communicate transaction requests, transaction information, authentication information, status information, and the like and/or combinations thereof.

In some aspects, a user may obtain information about other devices within a specified range using LoRaWAN communications. For example, if a user is looking for a device providing an e-mail terminal, the user may use his or her mobile device to obtain information for e-mail terminal devices in the local area. In another example, if a user is looking for an ATM for withdrawing money, the user may initiate a device status inquiry for ATMs in a specified range. The mobile device may generate a LoRaWAN signal that provides request parameters, including a type of device or type of service, a physical distance or range for the request, type of information desired and the like. In some instances, the user may only want to find devices having a certain capability within a certain distance such as 5 miles, 15 miles, 20 miles, 50 miles or the like. Additionally, or alternatively, the user may specify through the request that they wish to determine product types available at a certain type of device (e.g., vending machine). A variety of other request parameters may be defined and provided in a LoRaWAN signal.

According additional aspects, the device information request signal may be propagated based on a request distance. For example, if the original request specifies a search or inquiry distance of 25 miles, a device receiving the original request signal may help to propagate the request further. Signal or request propagation may be used depending on the communication range limits of the signal protocol or technology (e.g., LoRaWAN). Accordingly, a device receiving the original request signal from the user's device may serve as an intermediary for further transmitting requests and/or providing (e.g., forwarding) responses received from downstream devices.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
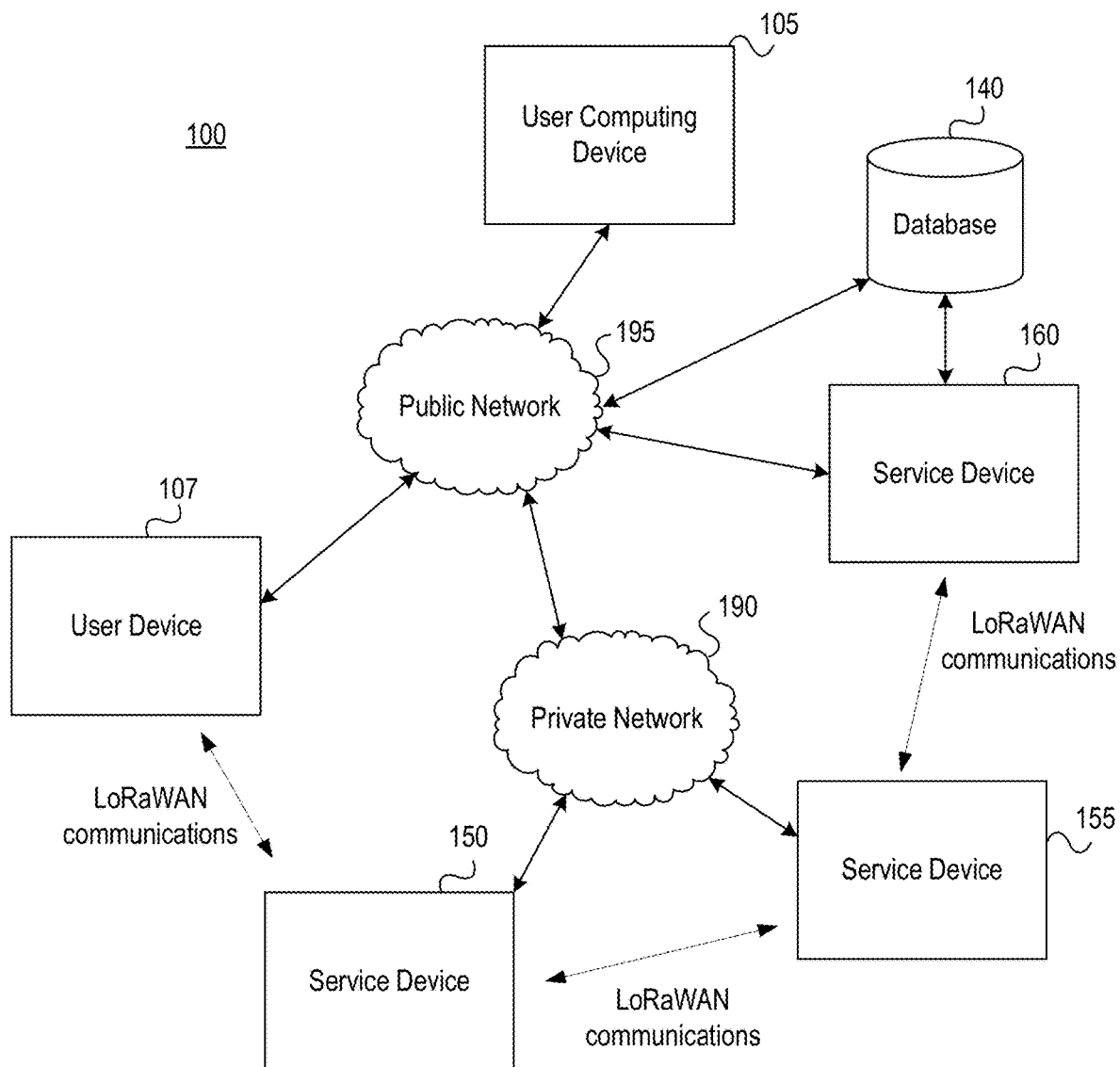
FIGS. 1A and 1B depict illustrative computing environments for implementing authentication and validation processing in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Device-to-device communications is integral to many types of technologies and industries. For example, these types of communications facilitate a wide range of activities including user and device authentication, automated computerized functions, complex task processing, transaction execution, and the like. Using long range and low energy consumption communications provides access to such activities to a greater range of devices and users. In particular, by using LoRa technology and LoRaWAN networks built on LoRa transmissions, devices with smaller battery capacity such as wearables (e.g., rings, watches, headsets) and the like may provide functionality similar to that of devices with larger battery capacity such as a laptop computer, tablet, smartphone and the like. Additionally, the longer range of LoRa technology (e.g., 10 miles) reduces the need to implement a more dense population of hotspots or wireless access points.

In some examples, LoRaWAN communications may be used to perform authentication. For example, a user may use a device (e.g., a smartphone or watch) to initiate a transaction at a self-service kiosk, such as an automated teller machine (ATM). For the ATM to perform transactions for the user or the user's account, the ATM might need to first authenticate the user or device. The ATM may perform such authentication using characteristics of a LoRaWAN signal. That is, different parameters of the LoRaWAN signal generation may be defined by different parts of a user's or device's information. Such information may include a telephone number, a social security number, an address number, a zip code, a personal identification number (PIN) and the like and/or combinations thereof.

Once the LoRaWAN signal has been generated by the user's device, the same signal (i.e., using the same information and procedure) may be generated by the ATM. The ATM may include a LoRaWAN receiver (e.g., a transceiver or separate transmitter and receiver modules) for receiving the LoRaWAN signal generated by the user's device as well as the LoRaWAN signal generated by the ATM itself. The ATM may then determine whether the two signals correspond and/or match. For example, the ATM may compare the signal characteristics to determine whether the signals match. In some examples, where the signals combine, the ATM may determine whether a resultant signal (e.g., resulting from a combination of the signals) has an amplitude that is a multiple of the amplitude of the original signal generated by the ATM device. If the ATM determines that the signals match or otherwise correspond, the user or device may be deemed to be authenticated or authorized.

In some arrangements, LoRaWAN signal authentication may be used as a verification procedure for performing a specific function. In one example, if a user's property (e.g., a credit card or identification card or device) is stuck or otherwise captured by a transaction processing device (e.g., an ATM), the transaction processing device may require verification before releasing the user's property or performing some other function with respect to the user's property. Accordingly, the transaction processing device may request that the user perform LoRaWAN signal authentication in order to obtain the user's property or to engage another function related to the return of the user's property.

LoRaWAN signaling may also be used to perform transactions that require verification or confirmation from another entity different from an entity with which the user is associated. For example, a user may wish to deposit a check using a check depositing device associated with the user's financial institution. If the payor account is also held by the user's financial institution, then the check depositing device may perform the deposit instantly (or near instantly) since the funds are being transferred intra-institution. If, however, the payor account is held by a different financial institution, the deposit may be subject to confirmation and/or verification by the other financial institution. In this instance, LoRaWAN signaling may be used by the check depositing device to communicate with a depositing device of the other financial institution. This signaling may request that the other depositing device provide immediate confirmation of the check deposit (or withdrawal from the perspective of the payor financial institution). Accordingly, check depositing between financial institutions may be performed more immediately.

Additionally, LoRaWAN signaling may be used to obtain device status information. For example, a user may attempt to identify devices that are able to perform a particular function (e.g., a particular type of device) within a local range. Using LoRaWAN signaling, the user's device may issue device information requests to all devices within LoRaWAN signaling range (e.g., 10 miles). Device status information collection might not be limited by an immediate LoRaWAN signaling range (e.g., of the user's device). Instead, the device status information request may include a request to propagate the signaling to further devices that might be outside of the user device's range using in-range devices as an intermediary.

These and various other arrangements will be discussed more fully below.

Figure 1B:
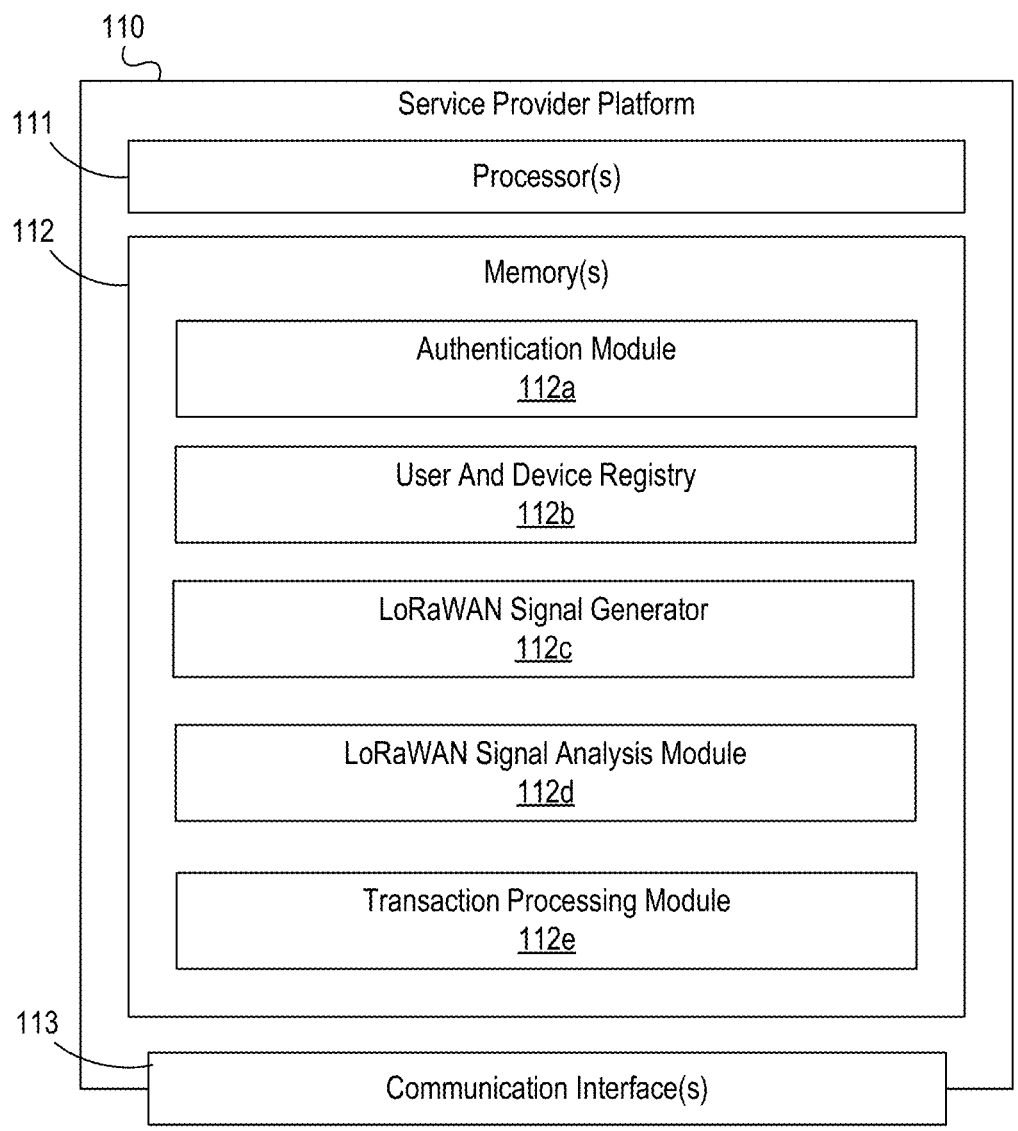

FIGS. 1A-1B depict illustrative communication and computing environments for transaction processing, including enrollment and validation, functions in accordance with one or more aspects described herein. Referring to FIG. 1A, computing environment 100 may include one or more computing and electronic devices and/or other computing systems connected through one or more networks. For example, computing environment 100 may include user devices 105, 107, database 140, and service devices 150, 155, 160. User devices 105, 107, may include laptops, mobile phones, smartphones, tablets, wearable devices (e.g., rings, earrings, glasses, watches, clothing and other communication-enabled apparel, bracelets, and the like) and the like. Such devices may include processors and communication interfaces with which the devices may communicate with each other and/or other devices. While the illustration of FIG. 1A includes a particular numbers of devices, any number of systems or devices may be used without departing from the aspects described herein.

As mentioned above, communication and computing environment 100 may include one or more networks, which may interconnect one or more of user devices 105, 107, database 140, and service devices 150, 155, 160. For example, communication and computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular user, location (e.g., home, office), and/or organization (e.g., a corporation, financial institution, educational institution, governmental institution, or the like) and may interconnect one or more computing devices associated with the user, location and/or organization. For example, private network 190 may be a network of a particular company (e.g., a wireless service provider or a financial institution). The private network 190 may thus interconnect devices 150 and 155 that are associated with the particular company, entity or organization as shown in FIG. 1A. The private network 190 may further provide access to a public network such as the Internet or another wide-area network (WAN) and devices external to the private network 190, including user devices 105, 107, database 140 and service device 160.

In some examples, one or more of user devices 105, 107 and service devices 150, 155, 160 may have one or more communication interfaces allowing the devices to communicate over one or more types of networks. A device such as user device 105 or service device 150 may include a cellular communication interface allowing for communication over cellular networks and access to a wide area network such as the Internet. A device might also have a Wi-Fi communication interface for access Wi-Fi hotspots or other access points for accessing wide area networks. Other communication interfaces may include Bluetooth™, NFC, infrared and the like. In one arrangement discussed herein, each of user devices 105, 107 and service devices 150, 155, 160 may include a low power long range (LoRa) communication interface. Accordingly, devices 105, 107, 150, 155, and 160 may communicate with one another using LoRa. In one example, the devices may access a LoRa wide access network (WAN) formed by LoRa-capable devices. A user device such as device 107 may, in some environments, only include a LoRa module. That is, the user device might only be able to communicate using LoRa protocol. This may be the case for devices that have smaller battery capacity or are smaller in size (e.g., wearable devices).

Device or user authentication may be used, and required, to access certain services provided or functions performed by service devices 150, 155, 160 and/or entities associated with devices 150, 155, 160. In one example, a user using device 105 may initially enroll with a service provider associated with devices 150, 155, and/or 160 by providing user identifying information. This user identifying information may include contact information (e.g., geographic location, name, address, etc.), payment information, identification information (e.g., driver's license ID, other government-issued ID, organization ID, etc.), and the like. Additionally, or alternatively, the user may also create credentials such as a password, passcode, and/or biometric key for accessing the user's account and services provided by service provider through devices 150, 155, and/or 160. In some instances, the credentials may be created and provided by the service provider. Service devices 150, 155, 160 may also be associated with different entities such as different companies or service providers. Accordingly, users may need to enroll or otherwise register with each service provider in order to use the services and functions available through service devices 150, 155, 160.

Service devices 150, 155, 160 may provide a host of functions and services including Internet access or other communication services (e.g., voice calls, email, web access, and the like), financial transactions such as cash withdrawals, deposits, balance checking, etc., product purchase and/or dispensing, and the like and/or combinations thereof. In one example, a user may use their device 107 to perform authentication with one or more of service devices 150, 155, 160. Accordingly, if the user wishes to withdraw cash or to deposit a check, a service device such as service device 150 may request that the user authenticate the user's identity. The authentication may include multiple processes. In one arrangement, the user may be required to first login to the service device 150 using a username, password, access device such as a transaction card or user device 107, biometric input and the like and/or combinations thereof. Authentication may further include additional validation using LoRaWAN signaling. This authentication process using LoRaWAN signaling may be activated or required in response to certain events or for particular functions. For example, if a user's transaction card is stuck or otherwise retained by the service device 150, the service device 150 may require additional authentication to activate a return process. In another example, certain types of transactions such as cash withdrawals or cash withdrawals above a certain amount and/or check deposits may require additional authentication. In yet another example, a user may be allowed to change a password or PIN or other identifying or security information upon performing the additional authentication.

LoRaWAN authentication signaling may be performed by requesting that the user's device such as device 107 generate a LoRaWAN signal with certain signal characteristics such as amplitude, wavelength, a Mel spectrogram parameter, and/or zero cross entropy value. Other signal characteristics may be similarly defined as needed or desired. The algorithm or parameters for defining the signal characteristics may be predefined and known to the user device 107 and/or may be communicated to the user device 107 at the time the signaling is requested. In some examples, the algorithm or signal definition parameters may be transmitted to the user device 107 through a different communication channel (e.g., through Wi-Fi, Bluetooth™, cellular communications, and the like) other than LoRaWAN signaling. This may provide added security. The signal generating algorithm or definition may use user identification information. For example, different parts of a user's information such as a phone number or social security number or address may be used to define each of the amplitude, wavelength, Mel spectrogram parameter, and/or zero cross entropy value of the signal to be generated.

In response to the request from the service device 150, the user device 107 may generate the LoRaWAN signal using the algorithm or signal definition received or known. Before, after, or in parallel, the service device 150 may also generate a LoRaWAN signal using the same algorithm or signal definition. The service device 150 may receive both the signal generated by user device 107 as well as the signal it generated itself and determine whether the signals correspond. An exact match may be required or, if the signals are in-phase and constructively superimposed, the service device 150 may determine whether the resultant signal has an amplitude that is a multiple of (e.g., double) the amplitude of the original signal.

In some arrangements, the LoRaWAN signaling may be generated by the transaction card (or other insertable transaction device) stuck or otherwise secured by the service device 150. For example, the service device 150 may emit a signal to energize a LoRaWAN chip within the transaction card to generate the LoRaWAN signal according to the predefined signal generation parameters/algorithm. Accordingly, in this example, the service provider may confirm that the transaction card that the user is seeking to obtain belongs to the user based on the signaling produced by the transaction card.

According to further aspects, service device 150 may use LoRaWAN signals to communicate with service device 155 if they are within a LoRaWAN signal range. This may allow service device 150 to process check deposits more quickly. That is, if a check payor is associated with a first financial institution, while the payee is associated with a second financial institution, the check deposit may need to be cleared by both financial institutions. By using LoRaWAN signaling, service device 150 (associated with the payee's financial institution) may seek clearance and confirmation of deposit from service device 155 (associated with the payor's financial institution) to more immediately or instantaneously deposit funds into the payee's account. For example, service device 150 may confirm to service device 155 that the payor's account has the amount of funds specified on the check and that the amount of funds has been deducted from the payor's account. Service device 150 may also confirm that a fund transfer has been executed between the financial institutions. Based on one or more of these confirmations, the payee's financial institution may be comfortable clearing the full deposit of the check.

LoRaWAN signaling may also be used to obtain device status information from devices that are not within a user's LoRaWAN signaling range. For example, if service device 150 is 5 miles from a user (e.g., associated with user device 107), while service device 155 is 13 miles away from the user, the user might only be able to obtain device status information for service device 150 using a signal generated by the user's device 107. However, service device 150 may propagate or repeat the device status information signal received from the user's device 107. This repeated or propagated signal may be received by service device 155 since it is within the LoRaWAN signaling range of service device 150. Accordingly, service device 155 may serve as an intermediary for both the status information request and any responsive communications. Similarly, service device 155 may propagate the request even further to reach service device 160, which may be situated 20 miles away from the user (i.e., out of range of the user's LoRaWAN signal and out of range of service device 150's LoRaWAN signal). Any of the devices shown in FIG. 1A may engage in LoRaWAN communications so long as they are within LoRaWAN range and are LoRa-capable.

Referring to FIG. 1B, a service device such as devices 150, 155, 160 may include a service provider platform 110. Service provider platform 110 may include one or more processors 111, memory 112, and one or more communication interfaces 113. A data bus may interconnect processor(s) 111, memory 112, and communication interfaces 113. Communication interfaces 113 may include a network interface configured to support communication between service provider platform 110 and one or more networks (e.g., private network 190, public network 195, or the like). In one example, communication interfaces 113 may include a LoRaWAN communication interface capable of sending and receiving LoRaWAN signaling. Memory 112 may include one or more program modules having instructions that when executed by processor(s) 111 cause service provider platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of service provider platform 110 and/or by different computing devices that may form and/or otherwise make up service provider platform 110.

Service provider platform 110 may have, store and/or include an authentication module 112a. Authentication module 112a may store instructions and/or data that may cause or enable service provider platform 110 to request information for a user or device and to confirm that the entered information matches with known identification information or credentials of that user or device. In one example, user authentication information may include a username, password, PIN, biometric data, e-mail address, user identification number (e.g., social security number) and the like and/or combinations thereof. Authentication module 112a may also be configured to process authentication using LoRaWAN signaling. For example, authentication module 112a may include instructions that specify parameters for LoRaWAN signal generation when such authentication is needed. These parameters may include a manner in which to define certain attributes of the signal such as wavelength and amplitude and the like. Authentication module 112a may further provide authentication confirmation parameters that define when a user or device is to be authenticated. For example, authentication module 112a may require that two LoRaWAN signals must be 95% matching or 90% matching or some other threshold. In another example, authentication module 112a may require that a superimposed constructive LoRaWAN signal have an amplitude that is exactly double (or some other multiple of) the amplitude of the original LoRaWAN signal generated by the user's device or service device. A variety of authentication thresholds and requirements may be defined by the authentication module 112a.

User and device registry 112b may be configured to store user information and device information for a registered user. A user registry portion of user and device registry 112b may store information for all registered users including identification information, contact information, access credentials (e.g., passwords, passcodes, cryptographic keys, two-factor authentication enrollment and information and the like), as well as other data. Additionally, registry 112b may include a device registry portion that identifies devices authorized to access services provided by the service provider platform 110. For example, a device registry portion of registry 112b may store information such as a device identifier (e.g., device name, a username for a user associated with the device, and/or the like), a network identifier (e.g., IP address, MAC address, and the like), device model, device configuration and capabilities, and the like. In some arrangements, devices stored in a device registry portion of registry 112b may be associated with a corresponding user in the user registry portion. These user-device associations may allow the service provider platform 110 to identify authorized devices for each enrolled user so that users may only access service provider platform 110 (and therefore, service devices) using their authorized devices. In other instances, the devices identified in registry 112b may be authorized for various functions, while devices not identified in registry 112b may be used by users for a more limited set of functions. Device and user information stored in registry 112b may be used by authentication module 112a and/or LoRaWAN signal generator module 112c in order to perform authentication processes.

Service provider platform 110 may further have, store and/or include a LoRaWAN signal generator module 112c. LoRaWAN signal generator module 112c may provide instructions for generating a LoRaWAN signal. For example, based on an algorithm specified by authentication module 112a, LoRaWAN signal generator module 112c may calculate or otherwise determine the various signal parameters. The signal parameters may include an amplitude, a wavelength, a zero entropy value, and/or a Mel spectrogram parameter. These parameters may then be provided to communication interface 113 (e.g., LoRaWAN transmitter) to produce and transmit the signal having the specified parameters.

Additionally, service provider platform 110 may further have, store and/or include a LoRaWAN signal analysis module 112d. Analysis module 112d may be configured to process received LoRaWAN signaling and determine messaging and/or attributes of the signal. In one example, the signal analysis module 112d may receive a signal (e.g., an analog signal) from communication interface 113 (e.g., a LoRaWAN receiver) and calculate or otherwise determine various parameters of the signal. These parameters may include an amplitude, a wavelength, a zero entropy value, and/or a Mel spectrogram parameter. These signal parameters may, in some examples, be provided to authentication module 112a to evaluate as part of an authentication process. For example, authentication module 112a may verify whether the parameters of the signal match expected parameters to authenticate a user or device. In some examples, the LoRaWAN signal analysis module 112d of a service device may process not only signals received from other devices, but also signals generated by that service device. In another example, the LoRaWAN signal analysis module 112d may receive a signal that is a result of constructive superimposition of a signal generated by the service device and a signal generated by a user device.

Service provider platform 110 may have, store and/or include a transaction processing module 112e. Transaction processing module 112e may provide a variety of functions and services including network communications (e.g., Internet access, email access, telephony, streaming video, entertainment, and the like), financial transactions, product vending and the like and/or combinations thereof. In some arrangements, transaction processing module 112e may provide cash withdrawal, check depositing, balance inquiries, currency conversion, email communications, text messaging, electronic fund transfers, and the like and/or combinations thereof. Transaction processing module 112e may operate in conjunction with authentication module 112a for performing one or more of the services, functions or transactions provided by the device. For example, transaction processing module 112e may require further authentication for some processes or functions. These processes or functions may include certain services (e.g., check depositing, funds transfers, withdrawals) and/or device functions such as access to certain physical portions of the device, execution of a transaction device return mechanism (e.g., if a transaction device is required to be inserted or otherwise received by the service device for a transactions), and the like. Accordingly, transaction processing module 112e may consult or obtain confirmation from authentication module 112a if such authentication is necessary.

Transaction processing module 112e may also interface with LoRaWAN signal generator module 112c, LoRaWAN signal analysis module 112d and/or communication interface 113 to process, transmit and/or receive information for particular transactions. For example, transaction processing module 112e may transmit and/or receive account information, a transaction amount (e.g., cash withdrawal, funds transfer), merchant identification, device status information, check information and the like to/from other service devices and/or to/from a user's device as needed or desired. In some arrangements, transaction processing module 112e may generate and transmit a confirmation of a transaction to a user's device upon completion of a transaction process. In yet another example, transaction processing module 112e may repeat or propagate messages received from other devices such as a user's request for device status information and responses to such requests.

Figure 2:
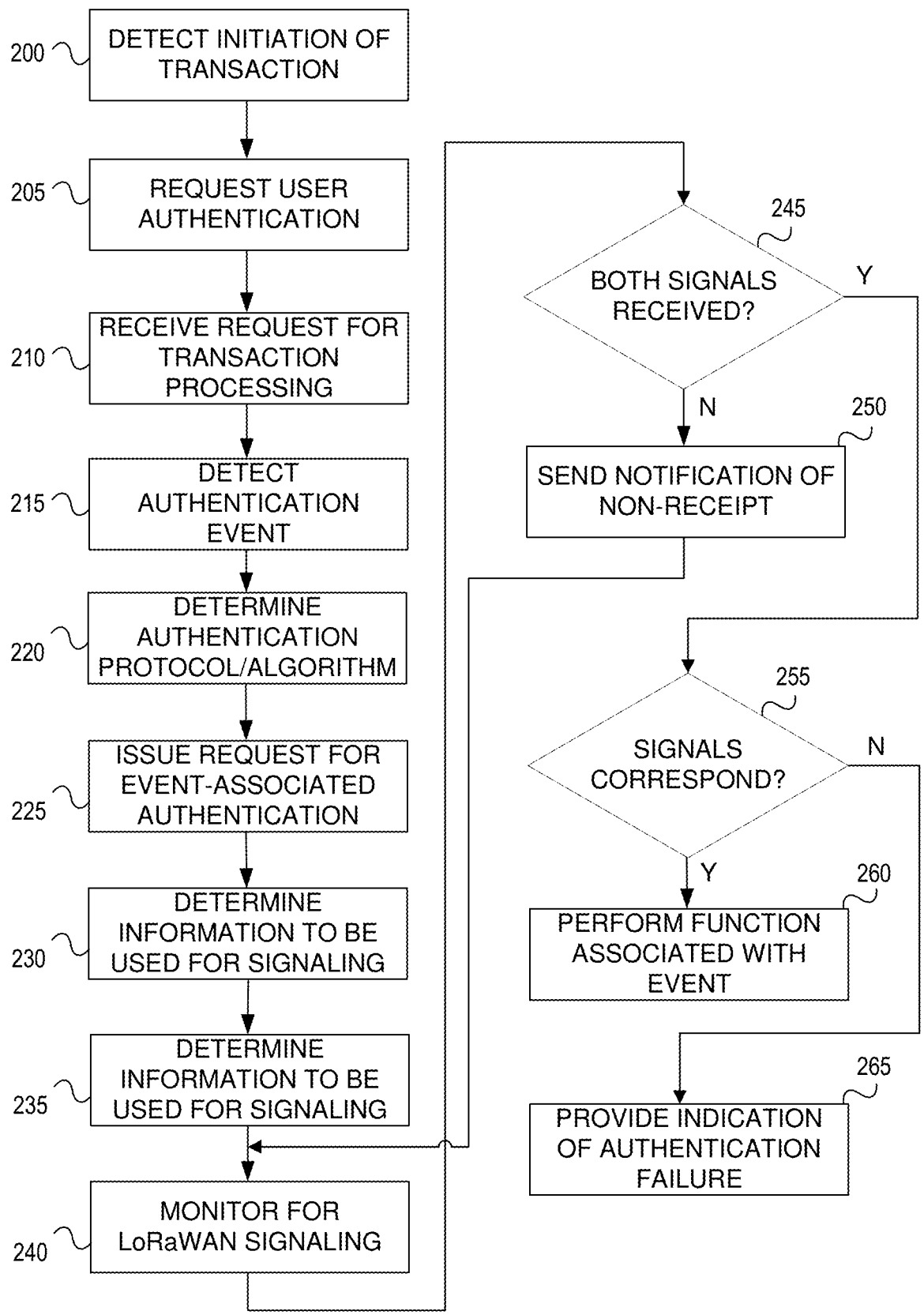
FIG. 2 is a flowchart illustrating an example authentication process according to one or more aspects described herein.

FIG. 2 is a flowchart illustrating an example process by which a user or device may be authenticated for performing a transaction function in accordance with one or more aspects described herein. In one arrangement, a computing device such as service device 150, 155 or 160 (FIG. 1) may be configured to provide financial transaction processing. The computing device may be a personal computer, a server, an automated teller machine (ATM), check processing device, cash depositing machine, cash dispensing machine, and the like and/or combinations thereof. In step 200, the computing device may detect an initiation of a transaction. For example, when a user wishes to conduct a transaction such as withdrawing money or depositing a check with the computing device, the user may use a user-specific device to verify their identity and credentials with the computing device. This user-specific device may be a transaction card (e.g., ATM card, debit card, credit card) or a mobile device such as a wearable electronic device, a mobile communication device and the like. In some cases, the user-specific device may be a mobile communication device configured to store and communicate transaction card information. The user-specific device may include various communication components such as a LoRaWAN transceiver configured to generate LoRaWAN signals, other communication interfaces such as NFC, Wi-Fi and cellular interfaces, a processor, memory, LoRaWAN chips, user input devices, speaker, microphone, display, camera and the like. In some arrangements, for example, the user-specific device may be a transaction card with an embedded LoRaWAN chip configured to generate a LoRaWAN signal.

The computing device may detect initiating of a transaction when the user-specific device is used to provide input. For example, a user may insert a transaction card into the computing device (e.g., an ATM) to initiate a transaction. In another example, a user may place his mobile communication device near the computing device in order to initiate a transaction. Upon detecting the initiation of a transaction, the computing device may request user authentication in step 205. This authentication process may include prompting or otherwise requesting that the user enter a password or passcode or biometric information to verify the user's identity. Verification may include comparing the user-entered authentication information with known or stored authentication information for that user. In one example, the user's authentication information may be retrieved using information from the transaction device such as a card number or account number or user identification number stored on the transaction device. The computing device may then compare an entered PIN or password with the stored authentication information for that user to determine whether the entered information is correct (e.g., matches).

Once the user's identity has been verified, the computing device may receive a user request to process or perform a particular transaction such as a deposit, a cash withdrawal, a balance check and the like in step 210. In some cases, an event may occur that requires the computing device to confirm authentication or validation of the user. The computing device may detect such an event in step 215 during the course of performing a transaction. In one example, during the course of processing a cash withdrawal, the user's card may become stuck in the computing device due to a failure of a device mechanism or the like. In another example, during the course of a check deposit, the computing device may detect abnormal activity (e.g., jostling of the computing device, too long of a pause between user input, unauthorized interaction with a transaction device slot (e.g., card slot) of the computing device, a change in the user at the computing device (e.g., based on image recognition or visual analysis using camera imagery), and the like and/or combinations thereof) and hold the card within the computing device intentionally.

The detected event may also be a particular type of transaction that requires further verification of the user. Thus, in one example, if the user wishes to withdraw an amount of cash above a daily withdrawal limit or other threshold, the computing device may proceed to dispense the amount of cash despite it being above the withdrawal limit if the LoRaWAN signal verification is successful. In another example, an event may be triggered by a user requesting to transfer money to another individual or entity. Fund transfers may require further authentication and as such, the computing device might not perform this transfer until the LoRaWAN signal verification is complete.

When the event is detected, the computing device may determine a protocol or algorithm for the event-associated authentication in step 220. This event-associated authentication or validation may be performed using LoRaWAN signaling because of its longer range (e.g., as compared to Bluetooth™, NFC, infrared communications) as well as its lower power consumption (as compared to Wi-Fi, cellular communications and the like). Accordingly, the computing device and a user communication device (that may be the same or different from the user-specific device) may be required to generate a LoRaWAN signal that has certain characteristics defined by specified types and/or portions of information such as information specific to the user. User-specific information may include a phone number, a user identification number, a user name, a passcode, a password, biometric data, a user account number, and the like and/or combination thereof. In some examples, the authentication signal generation protocol may require a device to use the first three digits of a telephone number to determine an amplitude of the signal, a second two digits to determine a wavelength, a third two digits to determine a Mel spectrogram parameter and a fourth three digits to determine or calculate a zero cross entropy value. Other algorithms for generating the LoRaWAN authentication signal can also be used, including using other types of information (e.g., a one-time PIN generated and issued by the service provider).

Once the LoRaWAN signal generation protocol or algorithm has been determined, the computing device may issue a request for event-associated validation or authentication to the user in step 225. The request for authentication may include instructions for generating a LoRaWAN signal by the user device. For example, the computing device may display instructions requesting that the user initiate LoRaWAN signal authentication through the user's device. The request may also specify the algorithm or protocol for generating the LoRaWAN authentication signal. In other cases, the algorithm or protocol may already be known to both the computing device and the user's communication device. In some arrangements, the computing device may transmit a message to the user's device that causes the user's device to automatically perform LoRaWAN signal generation and transmission. This message may be transmitted using LoRaWAN or another communication method such as Bluetooth™, cellular communications, Wi-Fi, NFC, infrared communications and the like and/or combinations thereof. In some examples, this request may be in the form of energizing a chip on a transaction or user device such as the transaction card or user wearable device or the like. The energization of the chip may cause the device to automatically transmit a LoRaWAN authentication signal based on a known protocol or algorithm.

Prior to, after, or in parallel with requesting the user device to generate the LoRaWAN authentication signal, the computing device may also generate a LoRaWAN signal based on the same protocol or algorithm. Accordingly, the computing device may, as part of this signal generation process, determine information to be used in generating the authentication signal in step 230. As discussed in one example, this information may be user-specific information and may be determined in a variety of ways. In one example, the computing device may energize a chip on the user-specific device in order to obtain (e.g., read) the user information. In another example, the computing device may read the information from magnetic strip on the transaction card. Alternatively or additionally, the computing device may request this information from the user communication device. In some examples, the user information may be retrieved from a remote server or database based on information already known about the requesting user. In still another example, the user information may be stored locally at the computing device. Accordingly, the computing device may transmit a request to obtain information such as a phone number, or user account number to a remote server based on the user's card number (which was detected upon the user initially interacting with the computing device) or the like. Once the signal-generating information has been determined, the computing device may then generate the LoRaWAN authentication signal using the determined information and in accordance with the determined protocol in step 235.

At step 240, the computing device may monitor for LoRaWAN signaling. This monitoring may be intended to capture both the authentication signal generated by the computing device as well as the authentication signal generated by the user's device. In step 245, the computing device may determine if both signals have been received. If not, the computing device may provide a notification such as a repeated request for the authentication signal in step 250. For example, if an authentication signal has not been received from the user's device, the computing device may notify the user (e.g., through the user's device). If a signal from the computing device has not been detected, the computing device may provide a notification or instruction to the signal generation module to repeat the signal. Notifications might only be sent after a certain amount of time has passed (e.g., 5 seconds, 10 seconds, 30 seconds, 1 minute, or the like).

Once the computing device has received both signals, the computing device may then determine whether the signals correspond in step 255. In some arrangements, the computing device may make this determination by determining whether a resultant signal (e.g., if the two LoRaWAN signals are additive, i.e., in phase and creating constructive superimposition) exhibits the expected wave characteristics. For example, the computing device may look for the same zero cross entropy, Mel spectrogram, and wavelength as was used to generate each of the respective signals. However, for the amplitude, the computing device may determine whether the amplitude of the resultant signal is double (or some other multiple) of the original amplitude given that the signals were constructively superimposed. In another example, the computing device may detect both signals individually and compare the two to see if the signals match one another. In some arrangements, the matching or correspondence algorithm may apply a threshold requirement such as a 95% match or 90% match or correspondence. That is, there might not be a 100% match or correspondence requirement.

Upon confirming that the LoRaWAN signals correspond, the computing device may then perform a function corresponding to the detected event in step 260. For example, if the detected event is a stuck or held transaction card, the computing device may determine that return, release, and/or retrieval of the card is authorized based on the further validation and authentication of the user. Releasing or returning the card may include allowing access to a particular portion of the computing device for retrieval. In another example, releasing or returning the card may include activating or deactivating a mechanical system (e.g., motors, electromagnetic locks, or the like) to allow conveyance of the card to the exterior of the computing system. In yet another example, releasing or returning the card may include sending a notification to personnel associated with an organization that owns the computing device and instructing the personnel to retrieve the card and return it to the user.

If the signals are determined to not correspond (e.g., match), the computing device might indicate that authentication failed in step 265. This indication may include other information or instructions for other options to resolve the detected event and/or may indicate that personnel associated with the service provider is needed and/or has been contacted.

The LoRaWAN authentication process as described herein (e.g., with respect to FIG. 2) allows for mobile devices to provide verification functionality. Because LoRaWAN requires low power consumption, a mobile device with relatively small battery capacity may be able to perform various types of functions requiring wireless communications, such as authentication or transaction processing. Additionally, LoRaWAN provides long distance communication capabilities. Accordingly, in some arrangements, if authentication requires a second individual for authentication, that second user may generate a LoRaWAN signal (through the second user's device) to be matched with a LoRaWAN signal generated by the computing device. For example, a user using a computing device such as an ATM may identify a second individual as an authenticating user when authentication is required. Accordingly, the computing device may request authentication by this identified authenticating user before performing some function in response to the detected event. The second individual might not be in the immediate vicinity of the user requesting the transaction and the computing device. Given LoRaWAN's range, however, authentication can still be performed.

Figure 3:
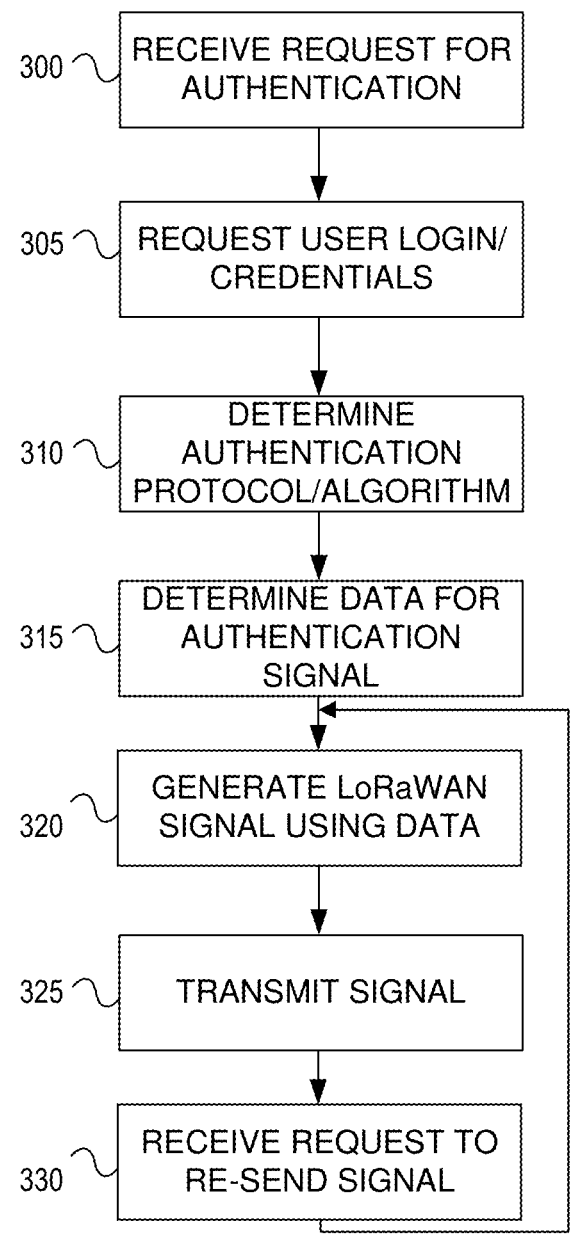
FIG. 3 illustrates is a flowchart illustrating an example authentication signal generation process according to one or more aspects described herein.

FIG. 3 illustrates an example process by which a user device such as a user communication device may provide authentication signaling for resolving certain events or requesting certain transactions in accordance with one or more aspects described herein. For example, when LoRaWAN authentication is required (whether it is primary or secondary authentication), the user communication device may be notified by receiving a request for authentication in step 300. In some examples, the user communication device may display a notification to the user indicating that the service provider device is requesting authentication. In other examples, the user device may automatically initiate an authentication process. Optionally, the user communication device may require the user to login or otherwise pass through a security check on the communication device in step 305 before generating and transmitting an authentication LoRaWAN signal in response to the received request. For example, the user communication device may display that the computing device is requesting verification, and, in conjunction, ask the user to enter biometric (facial recognition, fingerprint detection) information, a password, a passcode, or the like. Upon verifying the security information, in step 310, the user device may determine a protocol or algorithm to be used in generating the authentication LoRaWAN signal. In some arrangements, the protocol or algorithm may be provided as part of the authentication request message received in step 300. In other instances, the protocol or algorithm may be predefined and already stored in the user's communication device. The request message may provide an identifier or other information to help the user's communication device identify which protocol or algorithm is to be used. The protocol or algorithm may identify or otherwise define the data to be used for generating the authentication signal and how that data is to be processed to determine various characteristics of the authentication signal. For example, the protocol may call for the use of a user's mobile phone number and specify that various signal attributes are to be determined using a different digit or set of digits from the user's mobile phone number.

Once the user's device has determined the signal generating protocol, the device may obtain or otherwise determine the specified data or information in step 315. In some examples, the device may retrieve the specified data from memory or from a remote storage site where the user's information is stored. In other examples, the device may request the data from the user. For added security, the user may be requested to enter the specified type of user information each time a LoRaWAN signal is to be generated and sent, irrespective of whether the data is already stored in the device. Accordingly, in one example, if the LoRaWAN authentication signal is to be generated using a phone number, the user may be required to enter the phone number in the user communication device before the signal can be generated and sent by the communication device.

In step 320, the device may use the obtained information to generate the LoRaWAN signal according to the determined signal generating protocol. For example, the signal generation may be performed in the same or substantially similar fashion as the computing device in steps 235 and 240 of FIG. 2. Subsequently, the signal may be transmitted in step 325. In some cases, if the requesting computing device has not received the authenticating signal within a specified amount of time or after the user indicates that the signal has been sent, the user device may receive a subsequent request in step 330 to resend the signal. In that event, the user device may resend the signal via steps 320 and 325.

Figure 4:
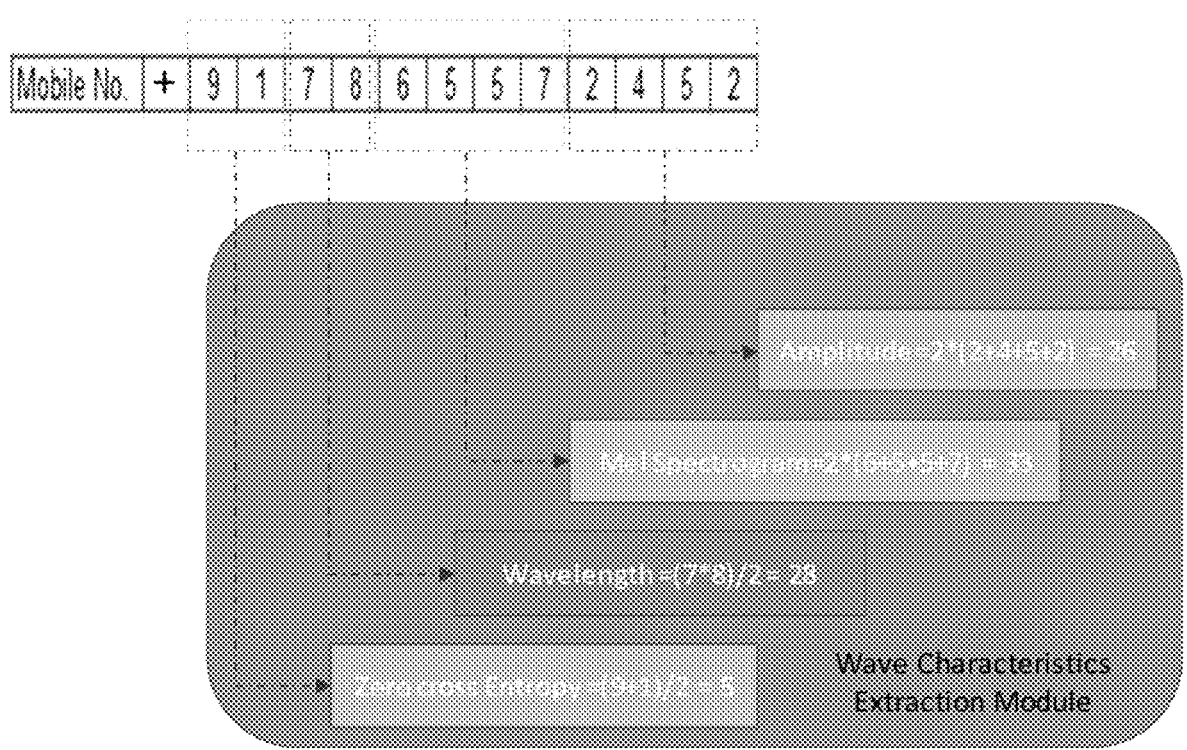
FIG. 4 illustrates an example signal generation algorithm and protocol according to one or more aspects described herein.

FIG. 4 illustrates an example of a LoRaWAN authentication signal generation protocol and algorithm in accordance with one or more aspects described herein. In this example, a user's phone number (e.g., a mobile phone number) is used to calculate or otherwise determine various attributes of the authentication signal to be generated. Amplitude, for instance, may be calculated by adding the last four digits of the phone number and multiplying that sum by two. A Mel spectrograph parameter may be similarly calculated by adding the next four digits (from the end of the mobile number) together and multiplying the sum by two. Next, a wavelength may be determined by multiplying the next two digits and dividing that product by two. Finally, a zero cross entropy value for the authentication signal is calculated by adding the first two digits of the user's mobile phone number and dividing the sum by two. In some examples, the values (e.g., digits of the phone number) used in each attribute calculation may overlap. A variety of different algorithms, calculations and determination methods may be applied using any of a multitude of information types. Additionally, different, fewer, or more attributes (e.g., phase) of a signal may be defined.

Figure 5:
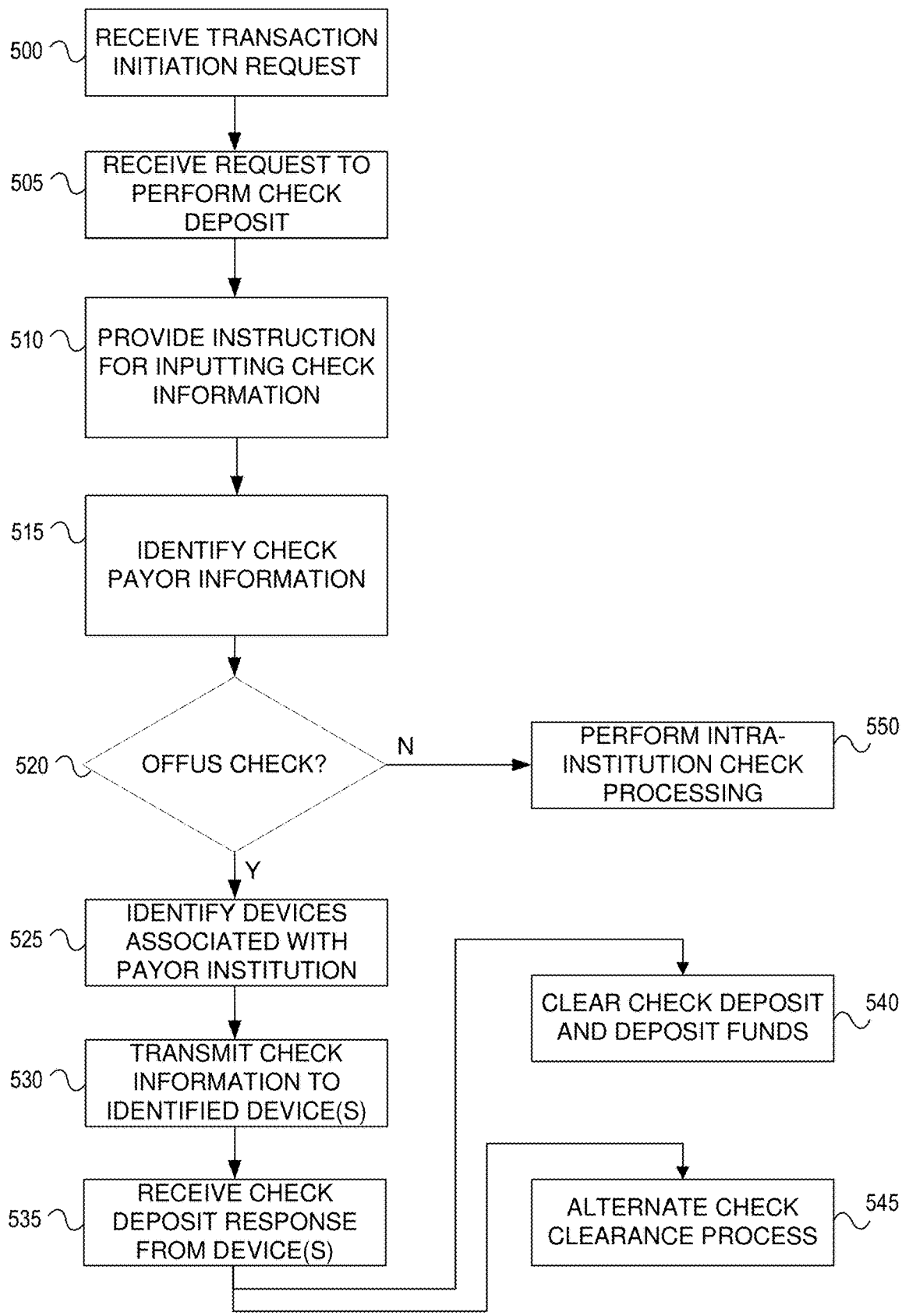
FIG. 5 is a flowchart illustrating an example process for check deposit processing and clearance according to one or more aspects described herein.

As discussed herein, a service computing device (e.g., device 150, 155 and/or 160) may be configured to provide financial transaction processing. The computing device may be an automated teller machine (ATM), check processing device, cash depositing machine, cash dispensing machine, and the like and/or combinations thereof. In some arrangements where the transaction requested is a check deposit, LoRaWAN authentication may also be used to process those deposits more quickly. FIG. 5 illustrates an example check deposit processing LoRaWAN signaling for more immediate check deposit clearance and funding in accordance with one or more aspects described herein. In step 500, a computing device such an ATM or other check depositing machine may receive a request to initiate a transaction. This may include the user verifying his or her identity by inserting a transaction card or providing security information through a mobile communication device (e.g., through Bluetooth™ or NFC credentialing). The information provided by the transaction card or mobile communication device may be accompanied by a request for additional security information such as a passcode or password or biometric data. This information may be provided through the computing device through a user interface. Alternatively, or additionally, the computing device may accept the further security information through wireless transmission from the user's device.

The computing device may subsequently receive user input selecting a check deposit option in step 505. In response to the selection, the user may undergo LoWaRAN verification as discussed herein with respect to FIG. 2 (steps 225-270), if check depositing is a specified event that requires such authentication. If such authentication is required, and authentication is completed (e.g., following step 265 of FIG. 2), or if authentication is not required, the computing device may then provide instruction to the user to insert or provide check information in step 510. Check information may be provided in ways other than insertion of a physical check. For example, check information including a routing number, account number, payor name, payor financial institution name, amount and the like may be transmitted digitally and wirelessly from the user's device to the computing device. In another example, a user may be asked to enter the check information. In yet another example, a user may transmit a photo or other image (e.g., scanned image) of the check to the computing device from the user's device. In some arrangements, the user may be required to provide check information in multiple ways such as by depositing the physical check as well as entering check information in the interface of the computing device.

In step 515, the computing device may determine payor information such as a payor financial institution, payor routing number, payor account number and the like. For example, if a physical check is deposited, the computing device may perform image recognition, optical character recognition, or other data detection processes to identify a payor financial institution and/or a payor account and routing number. For example, the computing device may scan a QR code or barcode that includes the payor information, may read a magnetic ink character recognition (MICR) line on the check, or the like. In another example, the computing device may scan numbers identifying a routing number and/or financial institution provided on the check, a check amount, a payor name, a payor address, a payee name and the like and/or combinations thereof. Once the payor financial institution has been determined, the computing device may then determine whether the check is an onus or an offus check in step 520. An onus check refers to a check where the payor is the same financial institution processing the deposit. An offus check refers to a check where the payor is a different financial institution from the institution processing the deposit. In one arrangement, the computing device may make this determination by sending an inquiry to a financial institution server with the routing number associated with the check. The financial institution server may be associated with the same financial institution with which the computing device is associated. In other examples, the financial institution server may be associated with a different financial institution or service provider. In another example, the computing device may store a database of routing numbers associated with its financial institution and determine that routing numbers not in the database correspond to offus checks. If the computing determines that the check deposit is for an onus check, the computing device may verify and clear the check deposit in an intra-institution process in step 550.

In step 525, if the computing device determines that the check is an offus check, the computing device may identify check processing devices associated with the payor financial institution using LoRaWAN communications (e.g., communications through a LoRaWAN network). In some arrangements, the computing device may broadcast a request for check processing to all LoRaWAN devices within the LoRaWAN range. The request may include a routing number and/or payor institution identifier. The computing device may then wait for a response from one or more check processing devices associated with the payor financial institution. Additionally, the computing device may verify that the identified devices are authorized devices associated with the payor financial institution as part of the identification process. For example, the computing device may perform such verification based on a predefined encryption or validation scheme such as known verification codes or encryption keys. In one example, each financial institution may store known encryption or verification codes for each of one or more other financial institutions with which they typically transact.

Upon identifying one or more check processing devices associated with the payor financial institution within LoRaWAN range, the computing device may transmit the check information to at least one of the one or more processing devices in step 530. This information may include an amount, an account number, a payor name, a date, a routing number and the like, and may be transmitted using LoRaWAN and/or using another communication interface. The check processing device(s) associated with the payor financial institution may then use this information to confirm that the payor information is valid and that the check amount is appropriately covered by the payor's account balance among any other requisite verifications that would need to be performed for the payor institution to clear the check deposit. In some arrangements, the check processing device(s) associated with the payor may proceed with withdrawing the funds from the payor's account and providing, to the computing device, a transaction confirmation identifier for the check withdrawal and corresponding deposit. The computing device may then receive a check deposit response from the payor institution associated with one or more check processing device(s) in step 535. The response may indicate whether the check deposit has been processed and cleared by the payor institution. Alternatively, the response may indicate that the check deposit must be processed in an alternate manner. If the response is a confirmation that the check deposit has been processed and cleared by the payor institution, the response may include the transaction confirmation identifier. Upon receipt of the confirmation, the computing device may proceed to clear the check deposit and update the payee's account with the amount of the check deposit in step 540. This deposit may be in the full amount of the check rather than an amount smaller than the actual amount listed on the check. If, however, the response indicates that an alternate checking deposit process must be performed, the computing device may instead provide some, but less than all, of the check amount to the payee's account in step 545.

LoRaWAN enables mobile devices having smaller battery capacities and sizes and more limited communication components and connectivity options with the ability to conduct transactions. For example, a mobile device such as a wearable or a mobile phone might wish to conserve battery power and limit the use of more power consuming communication protocols such as Wi-Fi or cellular communications. In some arrangements, wearable devices such as a smartwatch, smart glasses, smart rings and the like might not have space and/or the battery power to include multiple wireless communication components. Accordingly, the wearable device might only include wireless communication components for a low power communication chip such as a LoRa chip. As discussed, one of the benefits of using a LoRa chip is the longer communication range as compared to other low power wireless communication devices such as Bluetooth™, NFC, and the like. Using LoRaWAN communications, a wearable or other mobile device may perform wireless transactions with other devices.

Figure 6:
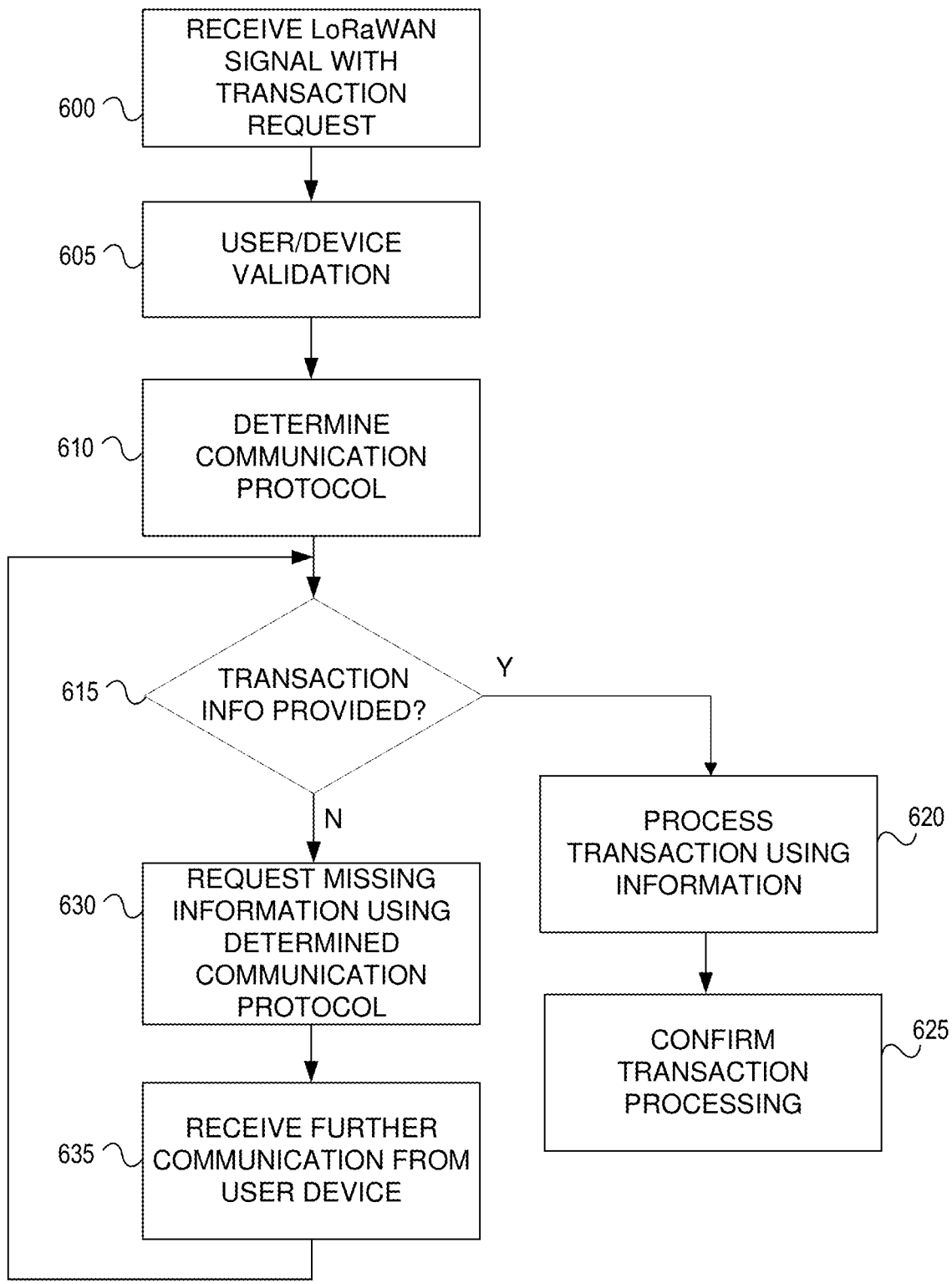
FIG. 6 is a flowchart illustrating an example process for mobile device transactions using LoRaWAN signaling according to one or more aspects described herein.

As illustrated in FIG. 6, an example method for performing transactions using only LoRaWAN communications may be initiated by a user providing input to a mobile device indicating a desire to perform a transaction. For example, a user may press a button on a smartwatch or an activity tracker indicating a desire to perform the transaction. In response to detecting this user input, the mobile device may obtain transaction information from memory. In some cases, the user may login to the transaction processing device separately from initiating the transaction request through his or her wearable device. Additionally, the LoRaWAN signal generation by the wearable device may be initiated responsive to a request by the transaction processing device to verify or validate the user and/or to send transaction information such as payment information. In other arrangements, the transaction processing device may be alerted to a transaction request based on the LoRaWAN signal generated by the mobile device.

Transaction information may include user-specific information such as a phone number, name, account number, passcode, private/public key pair, address, user preference information, and the like and/or combinations thereof. Using this information, the mobile device may generate a LoRaWAN signal and in step 600, the transaction processing device may receive the generated signal. In one example, the transaction processing device may be a self-service kiosk such as an automated teller machine (ATM), automated teller assistant (ATA), or the like, a point of sale device (e.g., a vending machine, a gas pump, etc.), another mobile device (e.g., of another user) and the like. The types of information used for LoRaWAN signal generation may be specific to the device type or capability, such as the device's memory capacity. Additionally, the LoRaWAN signal may be generated by using certain transaction information to define characteristics of the signal. For example, a transaction amount may be used to calculate an amplitude of the signal, while a merchant identifier may be used to generate the wavelength. Similarly, a payment account number may be used to calculate a zero cross entropy value. A variety of signal characteristics may be defined using transaction information and a variety of transaction information may be used.

Depending on the transaction processing device or entity associated therewith, user or device validation may be required in step 605. For example, this device or user validation may be performed using LoRaWAN signaling as described in steps 225-270 of FIG. 2. Additionally, in step 610, the transaction processing device may further determine a communication protocol with which the mobile device is able to communicate. In some examples, this communication capability information may be provided in the transaction request received from the mobile device in step 600. In other examples, the transaction processing device may determine the communication protocol based on the protocol used for the last communication from the mobile device. Once the user has been validated and/or the communication protocol(s) determined, transaction processing device may further determine whether required transaction information such as financial information has been provided by the mobile device in step 615. Financial information may include payment information, an amount authorized to be paid or sent, an amount to request for payment, account number, routing number, and the like and/or combinations thereof. If so, the transaction processing device may proceed to process the transaction in step 620. This transaction may be, for example, sending money, making a deposit, making a withdrawal, making a purchase and the like and/or combinations thereof. In some arrangements, the transaction processing device may execute the transaction itself (e.g., if the transaction is between the requesting user and the entity associated with the transaction processing device). Alternatively, if the transaction is associated with a third party (e.g., a merchant or service provider), the transaction processing device may transmit transaction information to the third party and request confirmation of the transaction. In some examples, the transaction information may include a confirmation of funds or payment. Upon determining that the transaction has been successfully processed, the transaction processing device may provide confirmation to the mobile device using the determined communication protocol in step 625. For example, the transaction processing device may provide confirmation using LoRaWAN.

If, however, required transaction information has not been provided at step 615, the transaction processing device may request that information from the mobile device in step 630. As with the transaction confirmation, the transaction processing device may use the determined communication protocol to respond to the mobile device. Accordingly, if the mobile device is only able to communicate through LoRaWAN, the transaction processing device may generate LoRaWAN signals to communicate the subsequent request for transaction information.

Accordingly, the mobile device may generate a second LoRaWAN signal to provide the additional requested information, and the second LoRaWAN signal may be received by the transaction processing device in step 635. Upon receipt of the second LoRaWAN signal containing the requested information, the transaction processing device may confirm receipt of the requested information, and, if received, process the transaction and provide confirmation as described in steps 615, 620 and 625, respectively.

Confirmation of the transaction processing may be transmitted back to the user-specific device in a subsequent LoRaWAN signal. Additionally or alternatively, confirmation may be transmitted to both the user-specific device as well as another communication device associated with a user. As discussed, this responsive communication may be transmitted using a protocol determined by the transaction processing device based on information from the user device. In yet other arrangements, the confirmation may be sent to a device different from the user-specific device. The other device may be a device with larger power capacity and/or a continuous power supply. In some examples, if a transaction is not successfully processed for any of a variety of reasons, the transaction processing device may provide a corresponding notification to the user through the device from which the request was received.

LoRaWAN signaling may be further used by devices to obtain status information from remote devices as well as for devices to provide status information to one or more requesting users. Because of the long-range communication capabilities of LoRaWAN protocol, status information for devices not within an immediate range of a requesting user or device may be obtained. In one arrangement, a user may activate a LoWaRAN device to obtain status information for devices within a specified area. This status information may include the location of devices with certain availability of capabilities (e.g., deposit-capable, withdrawal-capable, in-store personnel availability, etc.), fund availability (e.g., for withdrawals), whether the device is operational, a wait time to use the device and the like and/or combinations thereof. Not only would the user be able to obtain such status information from devices within a LoRa range, the signal-receiving devices may propagate the status information request to other devices that are within the signal-receiving devices LoRa range and return the information for those other devices as well.

Figure 7:
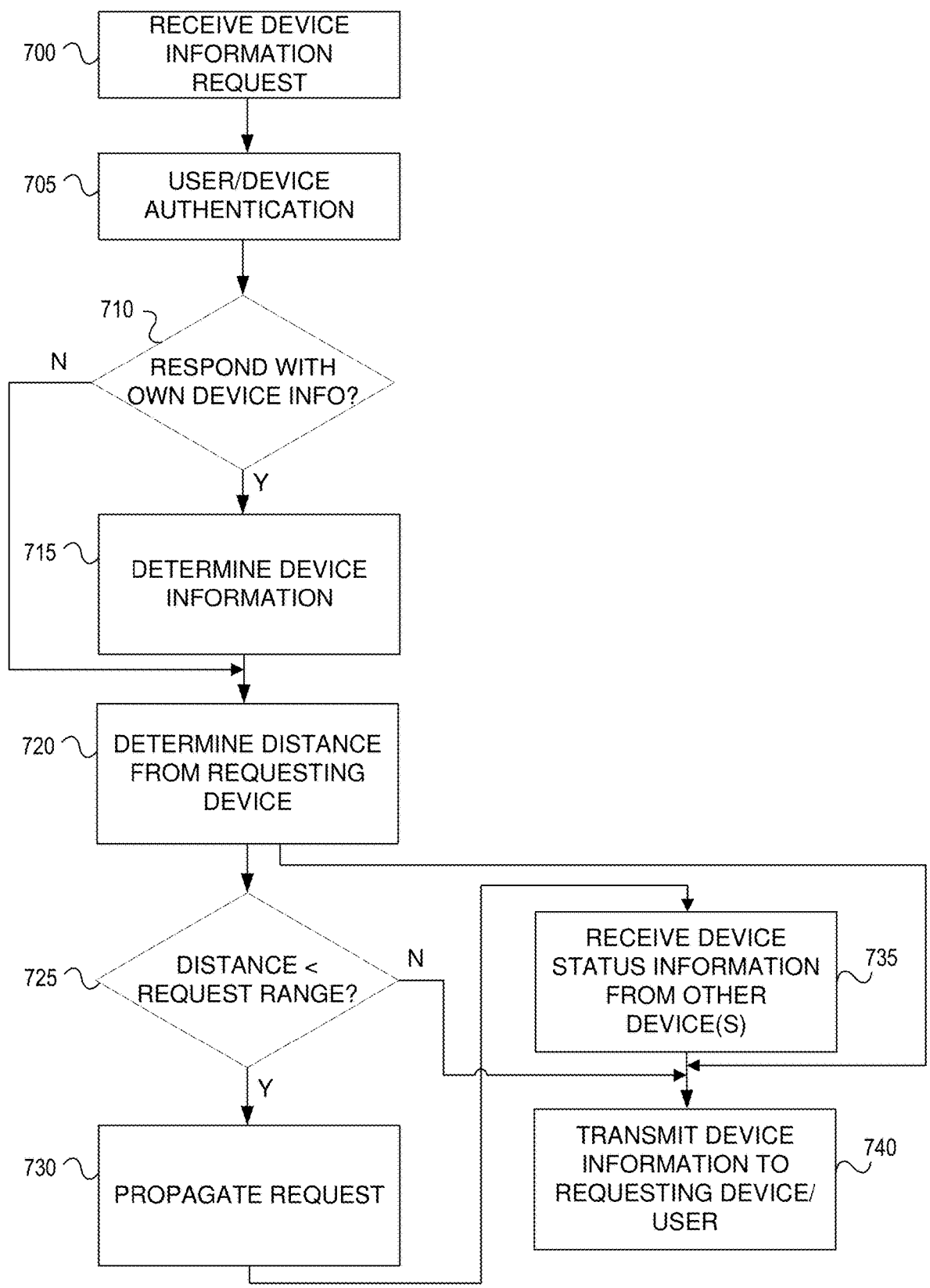
FIG. 7 is a flowchart illustrating an example process for determining device information according to one or more aspects described herein.

In one example and as illustrated in FIG. 7, a device status request may be initiated by a LoRa-capable device upon detecting user input requesting device information, such as device status and/or capabilities. For example, a user may wish to obtain status information for devices capable of providing a particular function such as food dispensing, financial transaction processing, communication functions (e.g., email, cell service, Wi-Fi hotspots), and the like. Upon detecting the user input, the LoRa-capable device may generate a LoRaWAN signal requesting device status information, which is subsequently received by a computing device in step 700. In one or more examples, the user input at the user's device may also specify a range for which device status information is desired. For example, the user may wish to obtain device information for all devices within a 10 mile range. In another example, the user may wish to obtain device information for all devices in a 50 mile range. Accordingly, the LoRaWAN signal may be generated and received with this distance specification as part of the request. Additionally, and if required/desired, the computing device may perform user and/or device authentication in step 705 to verify the identity of the requesting user and/or to ensure the requesting user is authorized to request the device information. In some arrangements, this authentication may be performed using LoRaWAN signaling according to the process described in steps 225-270 of FIG. 2. Alternatively, the authentication may use another protocol for confirming the user or device's identity.

Once the user and/or request has been validated (if required), the receiving computing device may determine whether to respond to the device information request with its own information in step 710. For example, the receiving computing device may determine whether it has the functionality specified in the request. In another example, the computing device may determine whether it is within a specified distance of the signal source (i.e., the LoRa-capable device). In yet another example, the receiving device may determine whether it is associated with a particular company or organization or other entity. For instance, only devices associated with a particular bank or communication company might respond to the request if the LoRa-capable source device is a member of or otherwise associated with that organization/company. If the computing device determines that it should respond and/or process the device information request, the computing device may determine its information (such as status) in step 715. This information may include a battery capacity (e.g., an amount of battery or power remaining), a communication capability (e.g., Internet-capable, or the like), a cash availability, a function availability (e.g., deposit-capable, withdrawal-capable, or the like). The computing device may then return its status information to the requesting device, e.g., in step 740.

Additionally, the computing device may determine a distance between the LoRa-capable source device and itself in step 720. In step 725, this distance may then be compared to a request distance specified in the status information request from the user device to determine whether the distance is less than the request distance. If the determined distance is less than the request range, the device may generate another LoRaWAN signal to propagate the request to other devices in step 730. This further LoRaWAN signal may also include the request distance information specified in the original request. In some examples, the request distance information may include a location of the requesting device/user and a request distance from that location. Additionally, other information in the original request may also be included in the propagated request signal, including capability information, types of status information requested, and the like. Using this information subsequent devices receiving the further LoRaWAN signal may appropriately evaluate whether they should respond to the request.

Accordingly, if a subsequent device receives the further LoRaWAN signal and determines that it should respond to the request, the subsequent device may generate a LoRaWAN signal containing device information in similar fashion to the first receiving device. The response signal may then be sent back to and received by the originator of the LoRaWAN signal, i.e., the first receiving device in step 735. The computing device may then transmit the subsequent device's information to the original requester in step 740.

Subsequent receiving devices may also evaluate whether it should propagate the request again similar to the evaluation performed by the initial receiving device. If so, subsequent receiving devices may generate a further LoRaWAN signal in similar fashion to the first receiving device. If the subsequent device determines that it should not respond to the request, then it may simply ignore the LoRaWAN signal/request.

In some arrangements, the receiving device which received the LoRaWAN signal request from the LoRa-capable device may wait for a certain amount of time before responding to the LoRa-capable device with status information (e.g., in step 740). For example, the receiving device may wait 5 seconds, 30 seconds, 1 minute or the like so that all device information, including device information for other devices, may be received and returned to the LoRa-capable device at one time or in a single message. Alternatively, the receiving device may transmit device status information as it is received and/or determined. In some arrangements, the communications including device status information requests and responses may be encrypted. The encryption may be specific to the requesting user or device and/or may be specific to an organization or entity (e.g., a financial institution, an employer, a merchant, etc.) with which the requesting user and/or device is associated.

Figure 8:
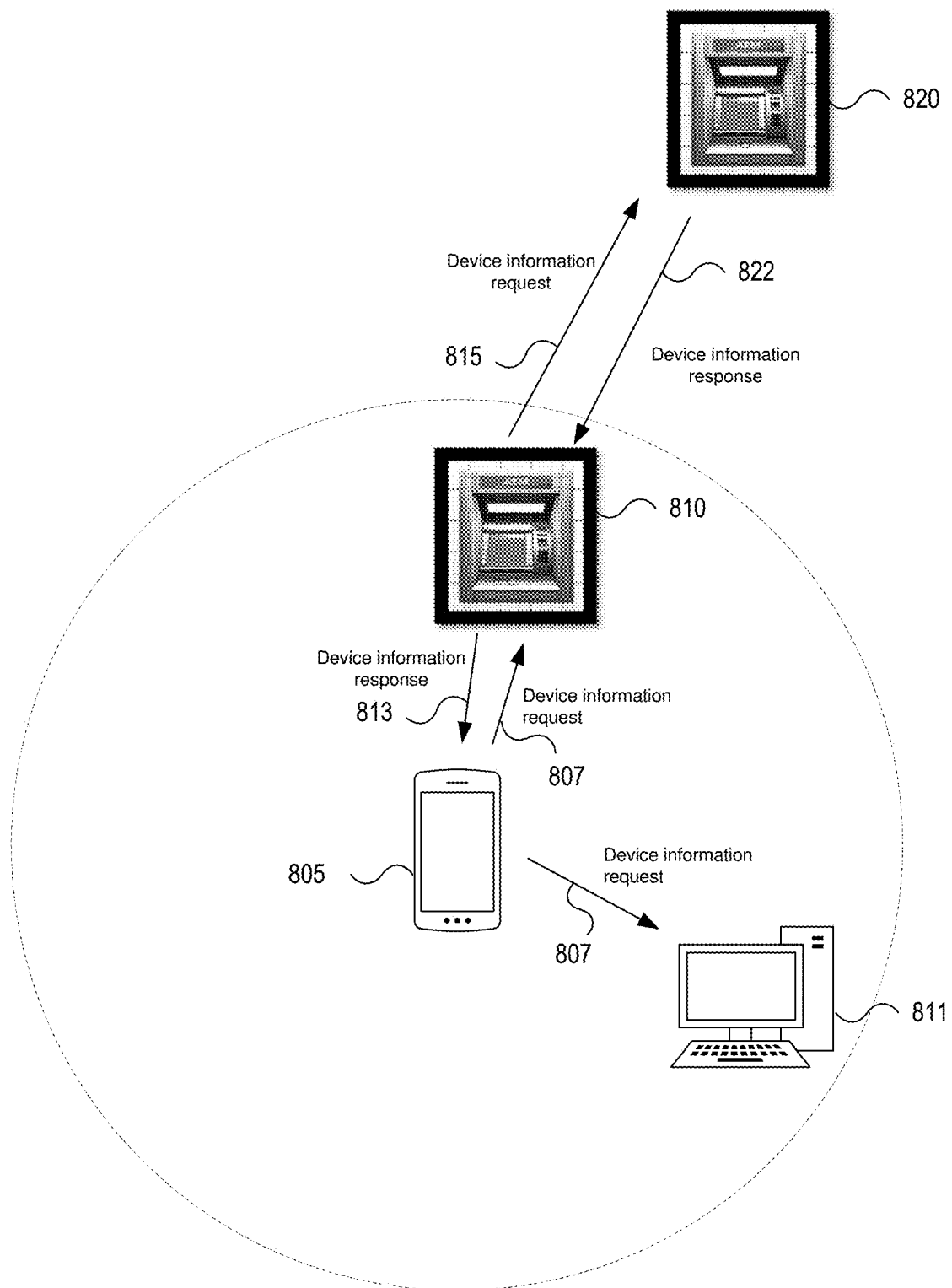
FIG. 8 is an illustrative system diagram depicting an example environment in which device information may be requested and received according to one or more aspects described herein.

FIG. 8 illustrates an example device network and environment in which requests and responses (and other types of communications) may be propagated and managed using LoRaWAN communications. For example, a request originating device 805 may transmit a LoRaWAN signal 807 upon receiving corresponding user input. The user may wish to find an available ATM that allows for cash withdrawals over a certain amount. Alternatively, the user may wish to find a drink or food vending machine. In another example, the user may want to identify the closest vehicle or device charging station. Accordingly, the signal may include such request information as well as a desired status range. The signal 807 may be received by devices 810 and 811 that are within the LoRaWAN range of device 805 (e.g., 10 miles; represented by the dotted line). Upon receipt of signal 807, devices 810 and 811 may determine whether it belongs to the category of devices for which status information is requested. In this example, device 810 does belong to the specified category of type of device and thus responds with status information in a signal 813. However, device 811 might not be a device of the specified type and thus might not respond to signal 807.

Devices 810 and 811 may determine whether their distance with originating device 805 is less than the specified status range. If so, devices 810 and 811 may propagate the request by generating their own LoRaWAN signals (e.g., signal 815) replicating the request message of the original signal 807. In some cases, if a device is not of the specified type or category (e.g., device 811), the device might not propagate the request further. Device 820 may be within LoRaWAN communication range of device 810 and thus receive signal 815 (but not original signal 807). Device 820 may similarly evaluate whether it is of the specified type of device and respond with status information if so. Device 820's response signal 822 may then be transmitted to and received by device 810, which may propagate or forward device 820's response back to original requesting device 805.

Other types of communications (e.g., instead of or in addition to device status information requests) may be coordinated in similar fashion. For example, emergency alerts may be transmitted in a daisy-chain or distributed fashion as described herein. In another example, other transaction, if not serviceable by a first device, may be forwarded on to another device to process. Such transactions may include processing a deposit, approval of a cash withdrawal, making purchases, communicating information over a wide area network such as the Internet (e.g., if a first device is unable to connect to the Internet, it may forward the communication to a second device in LoRaWAN range that is Internet-connected) and the like.

Figure 9:
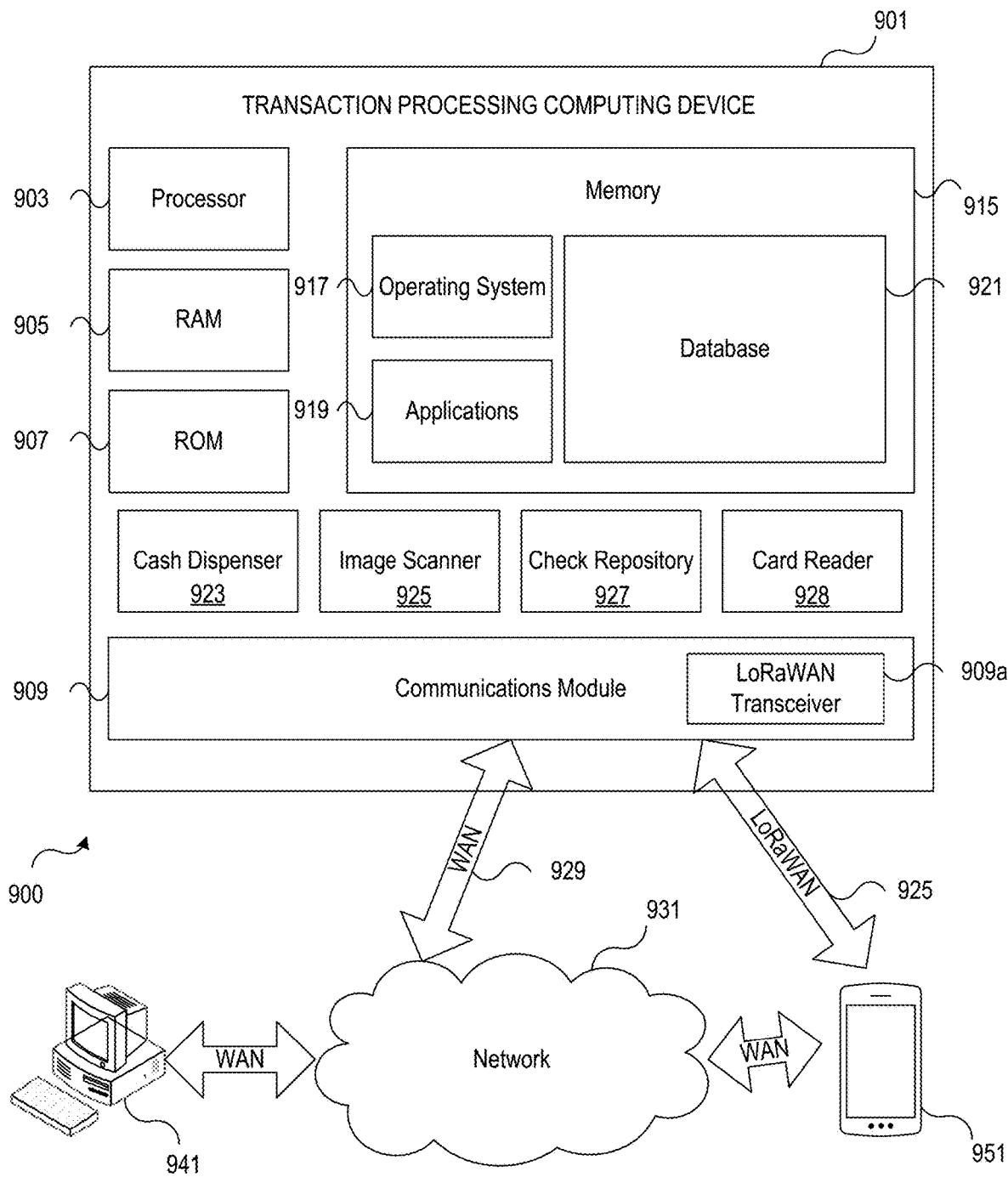
FIG. 9 illustrates an example computing system environment for user and device authentication, device communications, and transaction processing according to one or more aspects described herein.

FIG. 9 depicts an illustrative operating environment in which various aspects of the present disclosure may be implemented in accordance with one or more example embodiments. The arrangements described with respect to FIG. 9 may be applied any devices shown and described herein. Referring to FIG. 9, computing system environment 900 may be used according to one or more illustrative embodiments. Computing system environment 900 is only one example of a suitable computing environment and is not intended to suggest any limitation as to the scope of use or functionality contained in the disclosure. Computing system environment 900 should not be interpreted as having any dependency or requirement relating to any one or combination of components shown in illustrative computing system environment 900.

Computing system environment 900 may include transaction processing computing device 901 having processor 903 for controlling overall operation of transaction processing computing device 901 and its associated components, including Random Access Memory (RAM) 905, Read-Only Memory (ROM) 907, communications module 909, and memory 915. Transaction processing computing device 901 may include a variety of computer readable media. Computer readable media may be any available media that may be accessed by transaction processing computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by transaction processing computing device 901.

Additionally, transaction processing computing device 901 may further include other financial transaction processing components such as cash dispenser 923, image scanner 925, check repository 927 and card reader 928. Cash dispenser 923 may include a cash repository along with a mechanism for receiving and dispensing money. Image scanner 925 may be configured to scan text, images, symbols and the like from paper, cards, and other objects and media. In one example, image scanner 925 may be configured to scan information from checks or other financial instruments. Check repository 925 may be configured to store deposited checks. In some arrangements, check repository 925 and cash dispenser 923 may have security mechanisms to prevent unauthorized access. For example, these security mechanisms may be physical locks and/or electronic secure access features. Card reader 928 may be included in transaction processing computing device 901 to allow for reading a transaction card or the like. For example, card reader 928 may be configured to read a magnetic strip from a card. In other examples, card reader 928 may be configured to read information from a card using NFC or other close-range communication methods.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on transaction processing computing device 901. Such a processor may execute computer-executable instructions stored on a computer-readable medium.

Software may be stored within memory 915 and/or storage to provide instructions to processor 903 for enabling transaction processing computing device 901 to perform various functions as discussed herein. For example, memory 915 may store software used by transaction processing computing device 901, such as operating system 917, application programs 919, and associated database 921. Also, some or all of the computer executable instructions for transaction processing computing device 901 may be embodied in hardware or firmware. Although not shown, RAM 905 may include one or more applications representing the application data stored in RAM 905 while transaction processing computing device 901 is on and corresponding software applications (e.g., software tasks) are running on transaction processing computing device 901.

Communications module 909 may include a microphone, keypad, touch screen, and/or stylus through which a user of transaction processing computing device 901 may provide input, and may also include one or more of a speaker for providing audio output and a video display device for providing textual, audiovisual and/or graphical output.

Transaction processing computing device 901 may operate in a networked environment supporting connections to one or more other devices, such as computing devices 941 and 951. Computing devices 941 and 951 may be personal devices or servers that include any or all of the elements described above relative to transaction processing computing device 901.

The network connections depicted in FIG. 9 may include a variety of network types including Local Area Networks (LANs) and Wide Area Networks (WANs) (e.g., WAN 929). In some examples, a LoRaWAN interface 909a may be used to establish a connection between transaction processing device 901 and a user device such as device 951. Additionally, when used in a WAN networking environment, transaction processing computing device 901 may include a modem in communications module 909 or other means for establishing communications over WAN 929, such as network 931 (e.g., public network, private network, Internet, intranet, and the like). Further, when used in a LAN networking environment, transaction processing computing device 901 may be connected to a LAN also through a network interface or adapter in communications module 909. The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. An apparatus comprising:
   a Long Range Low Power Wide Area Network (LoRaWAN) transceiver;
   a processor; and
   memory storing computer readable instructions that, when executed by the processor, cause the apparatus to:
   receive a request for device status information from a user device, wherein the request includes an indication of a geographic range for device status information;
   determine whether the apparatus is within the indicated geographic range of the user device; and
   in response to determining that the apparatus is within the indicated geographic range of the user device:
   determine status information of the apparatus;
   generate and transmit a first LoRaWAN signal requesting status information of one or more other devices within the indicated geographic range of the user device; and
   transmit obtained status information to the user device using a second LoRaWAN signal, the obtained status information including the determined status information of the apparatus.

2. The apparatus of claim 1, wherein the instructions, when executed, further cause the apparatus to:
   after transmitting the first LoRaWAN signal requesting the status information of the one or more other devices:
   receive status information from at least one of the one or more other devices; and
   transmit the status information of the at least one of the one or more other devices to the user device as part of the second LoRaWAN signal.

3. The apparatus of claim 1, wherein the first LoRaWAN signal is generated to include the indicated geographic range of the user device and a location of the user device.

4. The apparatus of claim 1, wherein the instructions, when executed, further cause the apparatus to:
   in response to determining that the apparatus is outside of the indicated geographic range of the user device, ignoring the request.

5. The apparatus of claim 1, wherein the request includes a type of status information to be returned.

6. The apparatus of claim 1, wherein determining whether the apparatus is within the indicated geographic range of the user device includes determining whether a distance between the apparatus and the user device is less than the geographic range.

7. The apparatus of claim 6, wherein the instructions, when executed, further cause the apparatus to:
   in response to determining that the distance between the apparatus and the user device is greater than or equal to the indicated geographic range, responding to the user device with status information of the apparatus without repeating the request.

8. A non-transitory computer readable medium storing computer readable instructions that, when executed, cause an apparatus having a Long Range Low Power Wide Area Network (LoRaWAN) communication interface to:
   receive a request for device status information from a user device, wherein the request includes an indication of a geographic range for device status information; determine whether the apparatus is within the indicated geographic range of the user device; and
   in response to determining that the apparatus is within the indicated geographic range of the user device: determine status information of the apparatus;
   generate and transmit a first LoRaWAN signal requesting status information of one or more other devices within the indicated geographic range of the user device; and
   transmit obtained status information to the user device using a second LoRaWAN signal, the obtained status information including the determined status information of the apparatus.

9. The non-transitory computer readable medium of claim 8, wherein the instructions, when executed, further cause the apparatus to:
   after transmitting the first LoRaWAN signal requesting the status information of the one or more other devices:
   receive status information from at least one of the one or more other devices; and
   transmit the status information of the at least one of the one or more other devices to the user device as part of the second LoRaWAN signal.

10. The non-transitory computer readable medium of claim 8, wherein the first LoRaWAN signal is generated to include the indicated geographic range of the user device and a location of the user device.

11. The non-transitory computer readable medium of claim 8, wherein the instructions, when executed, further cause the apparatus to: in response to determining that the apparatus is outside of the indicated geographic range of the user device, ignoring the request.

12. The non-transitory computer readable medium of claim 8, wherein the request includes a type of status information to be returned.

13. The non-transitory computer readable medium of claim 8, wherein determining whether the apparatus is within the indicated geographic range of the user device includes determining whether a distance between the apparatus and the user device is less than the geographic range.

14. The non-transitory computer readable medium of claim 13, wherein the instructions, when executed, further cause the apparatus to:
   in response to determining that the distance between the apparatus and the user device is greater than or equal to the indicated geographic range, responding to the user device with status information of the apparatus without repeating the request.

15. A method comprising:
   receiving, by an apparatus through a Long Range Low Power Wide Area Network (LoRaWAN) communication interface, a request for device status information from a user device, wherein the request includes an indication of a geographic range for device status information;
   determining, by the apparatus, whether the apparatus is within the indicated geographic range of the user device; and
   in response to determining that the apparatus is within the indicated geographic range of the user device:
   determining, by the apparatus, status information of the apparatus;
   generating and transmitting, by the apparatus using the LoRaWAN communication interface, a first LoRaWAN signal requesting status information of one or more other devices within the indicated geographic range of the user device; and
   transmitting, by the apparatus, obtained status information to the user device using a second LoRaWAN signal, the obtained status information including the determined status information of the apparatus.

16. The method of claim 15, wherein the first LoRaWAN signal is generated to include the indicated geographic range of the user device and a location of the user device.

17. The method of claim 15, further comprising:
in response to determining that the apparatus is outside of the indicated geographic range of the user device, ignoring the request.

18. The method of claim 15, wherein the request includes a type of status information to be returned.

19. The method of claim 15, wherein determining whether the apparatus is within the indicated geographic range of the user device includes determining whether a distance between the apparatus and the user device is less than the geographic range.

20. The method of claim 15, further comprising:
after transmitting the first LoRaWAN signal requesting the status information of the one or more other devices:
receiving status information from at least one of the one or more other devices; and
transmitting the status information of the at least one of the one or more other devices to the user device as part of the second LoRaWAN signal.

* * * * *